Patented Mar. 24, 1936

2,035,145

UNITED STATES PATENT OFFICE 2,035,145

METALLO-ALBUMIN-TANNIN COMPOUNDS

Henryk Cohn and Conrad Siebert, Berlin, Germany

No Drawing. Application October 3, 1933, Serial No. 692,027. In Germany April 30, 1930

7 Claims. (Cl. 260—9)

This invention has for an object metallo-albumin-tannin compounds which are easily soluble in water, these compounds being such in which the albumin is combined with the tannin as well as with the metal. Combination of the albumin in this twofold manner is provided by dissolving tannin-esters still containing unsubstituted hydroxy groups which are saponifiable by means of a normal solution of sodium carbonate at ordinary temperature only with difficulty, viz. such tannin-esters as benzoyl-tannin-ester, acetylsalicylyl-tannin-ester, lactyl-tannin-ester, and the like, in such amount of a basic solvent, or of a substance, the aqueous solution of which has an alkaline reaction, that the solution still reacts slightly acid, whereupon the solution is saturated with an aqueous solution of a metallo-albumin. Solvents and substances suitable therefor, as regards the esters stated, are alkali-metal carbonates, alkali-metal-bicarbonates, and ammonia.

It has been found that with compounds manufactured in the above-stated manner, the chemical stability or strength of bonding of the acidic esters is considerably greater than is the case with the known acetyl-tannin-albumin compounds. This fact assures that the acid esters can be split off only with much greater difficulty and in a considerably lesser degree than heretofore, and in view thereof the therapeutic effect of metallo-albumin-tannin-esters manufactured according to the present invention is considerably greater than is the case with the known diacetyl tannin silver albumin diacetyl-tannin.

The new technological effect is, furthermore, based upon a greater solubility in water of the new compounds in question; they are soluble in water up to about 70%. However, even solutions up to about 80% of said new metallo-albumin compounds are also possible, these solutions being more or less thin or thick syrups or pastes, as the case may be. The greater solubility in water is important also in therapeutic respects, and renders possible the employment of the said compounds in solutions of such degree of concentration as heretofore has not been known; it is, in fact, even possible to use them in pulverulent form in which they are at once completely absorbed by the humors of the human body.

The process can be carried out, for instance, as follows:

1. Manufacture of a silver-albumin-benzoyltannin 1 gr. of benzoyl-tannin, manufactured, for instance, according to the process described in the German Patent No. 92,420, is dissolved in alkali and the solution is then introduced, while stirring, into a solution of 6 gr. of argentum proteinicum in 15 gr. of water, whereafter the solvent is evaporated, there being obtained in this manner, or remaining, the silver-albumin-benzoyl-tannin compound which has a metallic luster and is soluble in water. The percentage of silver of the same amounts to about 6.2.

2. Manufacture of a gold-albumin-benzoyltannin 50 gr. of casein (an albumin) are boiled together with 250 ccm. of water and 22 gr. of a 33% soda lye for a few hours, and the product is then filtered; thereupon dilute nitric acid is added as long as the precipitate at first formed is again dissolved with the aid of the lye. Now 150 gr. of a solution of gold chlorid are added in the cold state with stirring, and then the mass so produced is heated to about 90° C. until a clear solution is obtained. Finally, the solution is cooled, dialyzed, and dried in vacuo.

A solution of 1 gr. of benzoyl-tannin in 10 parts of alcohol is introduced with stirring into a preferably concentrated aqueous solution of 6 gr. of gold-albumin, made, for example, as just described, and the resulting gold albumin-benzoyl-tannin compound is dried in vacuo at a low temperature. The product is easily soluble in water.

3. Manufacture of a bismuth-albumin-benzoyltannin

This process is carried out similarly to that involving gold-albumin. The conversion takes place with a bismuth-nitrate solution to which so much mannite has been added that a clear solution is obtained.

The bismuth-albumin-benzoyl-tannin compound is produced under the same conditions as the corresponding gold-albumin benzoyl-tannin compound. The product is easily soluble in water.

4. Silver albumin-lactyl-tannin 20 parts of tannin are intimately mixed with 10 parts of highly concentrated lactic acid and are caused to react by means of careful heating. The thus formed lactyl-tannin is a dark and tough mass which is easily soluble in water and in dilute alkalies.

2.5 parts of lactyl-tannin are dissolved in 30 parts of dilute solution of an alkali, whereafter 15 gr. of argentum proteinicum are added. After the lactyl tannin and the argentum proteinicum have become dissolved and have reacted with one another the mass is dried in vacuo at a low temperature. The percentage of silver is about 6.4, and the reaction of the solution is acidic.

5. *Silver-albumin-acetyl-salicylyl-tannin*

For manufacturing the acetyl-salicylyl-tannin, 20 gr. of tannin are introduced into a dry methyl-alcoholic solution of 10 parts of acetyl-salicylic acid, whereafter the mixture is boiled for 24 hours in a reflux receptacle. The solvent is then evaporated and the remaining product is washed with a little ether in order to remove the excess of acetyl-salicylic-acid; then any unconverted tannin still present is removed by means of water. The product is soluble in water only with difficulty, but is easily soluble in an alkali solution.

2.5 parts of the acetyl-salicylyl tannin are dissolved in 30 parts of dilute alkali solution and 12 parts of argentum proteinicum are added. After the dry substances have become dissolved and reacted the solvent is evaporated at a low temperature and the product thus dried. The percentage of silver is about 6.4 and the reaction is acidic.

We claim:

1. A metallo-albumin-tannin compound for therapeutic use, which is very readily soluble in water and which is very stable and wherein the albumin is combined directly with the tannin compound of a carboxylic acid which is non-volatile at ordinary temperatures, and with a metal.

2. A metallo-albumin-tannin compound for therapeutic use, which is very readily soluble in water and which is very stable and wherein the albumin is combined directly with the tannin compound of a carboxylic acid which is non-volatile at ordinary temperatures, and with a heavy metal.

3. A metallo-albumin-tannin ester for therapeutic use, which is very readily soluble in water and which is very stable and wherein the albumin is combined directly with the tannin ester of a carboxylic acid, which is non-volatile at ordinary temperatures, and with a metal.

4. A metallo-albumin-tannin-ester for therapeutic use, which is very readily soluble in water and which is very stable and wherein the albumin is combined directly with the tannin ester of a carboxylic acid which is non-volatile at ordinary temperatures, and with a heavy metal.

5. A compound as defined in claim 2, wherein the heavy metal is silver.

6. A compound as defined in claim 2, wherein the heavy metal is gold.

7. A compound as defined in claim 2, wherein the heavy metal is bismuth.

HENRYK COHN.
CONRAD SIEBERT.